(12) United States Patent
Ivanov et al.

(10) Patent No.: US 9,457,475 B2
(45) Date of Patent: Oct. 4, 2016

(54) ROBOTIC PLACEMENT AND MANIPULATION WITH ENHANCED ACCURACY

(71) Applicants: Yuri A. Ivanov, Arlington, MA (US); Rodney Brooks, Cambridge, MA (US)

(72) Inventors: Yuri A. Ivanov, Arlington, MA (US); Rodney Brooks, Cambridge, MA (US)

(73) Assignee: Rethink Robotics, Inc., Boston, MA (US)

( * ) Notice: Subject to any disclaimer, the term of this patent is extended or adjusted under 35 U.S.C. 154(b) by 35 days.

(21) Appl. No.: 14/511,718

(22) Filed: Oct. 10, 2014

(65) Prior Publication Data

US 2015/0105908 A1 Apr. 16, 2015

Related U.S. Application Data

(60) Provisional application No. 61/889,630, filed on Oct. 11, 2013.

(51) Int. Cl.
*G05B 15/00* (2006.01)
*B25J 9/16* (2006.01)

(52) U.S. Cl.
CPC .... *B25J 9/1697* (2013.01); *G05B 2219/36414* (2013.01); *G05B 2219/39101* (2013.01); *G05B 2219/40562* (2013.01); *G05B 2219/49113* (2013.01); *Y10S 901/47* (2013.01)

(58) Field of Classification Search
CPC .......... G05B 2219/36414; G05B 2219/39101; G05B 2219/40562; G05B 2219/49113; Y10S 901/47
USPC ...................................................... 700/259
See application file for complete search history.

(56) References Cited

U.S. PATENT DOCUMENTS

| 5,608,847 A | * | 3/1997 | Pryor | A01B 69/008 |
| | | | | 700/248 |
| 6,293,742 B1 | * | 9/2001 | Miyagi | B32B 23/00 |
| | | | | 29/40 |
| 6,332,636 B1 | * | 12/2001 | Cohen | G01N 35/0099 |
| | | | | 294/119.1 |
| 7,957,583 B2 | * | 6/2011 | Boca | B25J 9/1697 |
| | | | | 345/419 |
| 8,244,402 B2 | * | 8/2012 | Wells | G06K 9/3216 |
| | | | | 318/568.11 |
| 2003/0200042 A1 | * | 10/2003 | Gan | B25J 9/1692 |
| | | | | 702/105 |

(Continued)

FOREIGN PATENT DOCUMENTS

| EP | 381185 A2 | 8/1990 |
| EP | 0381185 A2 | 8/1990 |
| GB | 2363861 A | 1/2002 |
| JP | 2011-104733 A | 6/2011 |
| WO | 2009/123956 A1 | 10/2009 |

OTHER PUBLICATIONS

International Search Report and Written Opinion issued in corresponding International Patent Application No. PCT/US2014/060078 dated Jul. 8, 2015.

*Primary Examiner* — Ian Jen
(74) *Attorney, Agent, or Firm* — Morgan, Lewis & Bockius LLP

(57) ABSTRACT

Systems and methods for providing precise robotic operations without the need for special or task-specific components utilize, in one implementation, a spatial adjustment system, physically separate from the robotic manipulator, supports the target workpiece and works in concert with the robotic manipulator to perform tasks with high spatial precision.

18 Claims, 7 Drawing Sheets

(56) References Cited

U.S. PATENT DOCUMENTS

| | | | |
|---|---|---|---|
| 2008/0319557 A1* | 12/2008 | Summers | G05B 19/4015 700/19 |
| 2009/0096148 A1* | 4/2009 | Usui | B23Q 41/02 269/45 |
| 2010/0069920 A1* | 3/2010 | Naylor | A61N 5/1049 606/130 |
| 2012/0215354 A1* | 8/2012 | Krasny | B25J 9/1666 700/255 |
| 2012/0253507 A1 | 10/2012 | Eldershaw et al. | |

\* cited by examiner

ROBOTIC PLACEMENT AND MANIPULATION WITH ENHANCED ACCURACY

CROSS-REFERENCE TO RELATED APPLICATION

This application claims priority to, and the benefits of, U.S. Ser. No. 61/889,630, filed on Oct. 11, 2013, the entire disclosure of which is hereby incorporated by reference.

FIELD OF THE INVENTION

Embodiments of the present invention generally relate to a robotic system and, in particular, to robotic placements and manipulations with enhanced accuracy.

BACKGROUND

Robots have been deployed across numerous industrial and manufacturing environments to promote reliability and cost savings. For example, a robotic arm can move objects to perform tasks, including assembly, packaging, inspection, etc. A manipulator is typically placed on an extended robotic arm such that the point of manipulation may be easily adjusted. Controlling the manipulator precisely through the extended robotic arm, however, may be challenging. For example, the manipulator typically has a significant mass; to support such a load with a desired precision extending all the way to the root joint of the robot, each joint in the kinematic chain between the arm and root joint has to operate within a very strict tolerance for position errors. In other words, all joints in the kinematic chain have to operate at the same or better precision compared with the desired precision at the target. For example, an angular precision of the motor at the root of the arm is required to be within 0.03 degree to guarantee that a manipulator located at the end of a two-meter robotic arm is within 1 millimeter of the target position. Such strict requirements result in complexity and high cost.

Additionally, the robotic system needs to apply large forces to dampen any possible dynamic effects of the overall arm motion. Even for the straightforward task of handling a lightweight target, delivering the target with sub-millimeter or sub-degree precision may still be challenging. For example, in a simple assembly task, a screw may weigh just a few milligrams at the end of the two-meter robotic arm; yet the robotic machinery for delivering the screw must be able to support itself—including all the motors, gearboxes and electronics—when fully extended while maintaining precise position control at every joint and, additionally, compensate for backlash, bending, slippage and cumulative errors in the kinematic chain. This, again, significantly increases the design complexity and manufacturing cost of the robotic system.

Conventionally, a robotic system that can perform high-precision target manipulations utilizes parts and techniques that are specialized to the given task. This not only requires a specific and careful design, thereby increasing the system complexity and cost, but also limits the general applicability of the robotic system. Consequently, there is a need for a robotic system that provides precise target manipulations without the need for specialized or task-specific components or techniques.

SUMMARY

In various embodiments, the present invention relates to systems and methods for providing precise robotic operations without the need for special or task-specific components. In one implementation, a spatial adjustment system, physically separate from the robotic manipulator, supports the target workpiece and works in concert with the robotic manipulator to perform tasks with high spatial precision. During operation, the robotic system first coarsely moves a robotic manipulator to the neighborhood of the target. A tracking system within or cooperating with the spatial adjustment system can precisely detect the position of the robotic manipulator and transmit the information to a controller. The controller then commands one or more actuators in the spatial adjustment system to adjust the position of the target based on the detected position of the robotic manipulator. Because the spatial adjustment system can align the target workpiece to the robotic manipulator with high spatial precision, the task is performed accurately without requiring all robotic joints in the kinematic chain between the robotic arm and root joint to operate within a limited tolerance of position errors. Accordingly, the current invention provides accurate target manipulations for a robotic system that can be easily and economically manufactured.

Accordingly, in a first aspect, the invention pertains to robotic system for manipulating a target. In various embodiments, the system comprises a robotic manipulator; a positioning system, physically separate from the robotic manipulator, for supporting and moving the target; a tracking system for detecting a position of the robotic manipulator; and a controller, responsive to the tracking system, configured to control the positioning system to adjust a position of the target based at least in part on the position of the robotic manipulator detected by the tracking system.

In various embodiments, the positioning system comprises a movable platform for supporting the target and at least one actuator, responsive to the controller, for moving the platform for adjusting the target position. For example, the robotic manipulator may comprise a light source and the tracking system may comprise an imaging device; in some implementations, the light source generates light outside a spectrum visible to human eyes (e.g., in the infrared wavelength band).

The positioning system may comprise a first actuator for translating the target in a first direction and a second actuator for translating the target in a second direction, the second direction being different from (e.g., orthogonal to) the first direction. In some embodiments, the positioning system further comprises a third actuator for translating the target in a third direction, the third direction being different from (e.g., orthogonal to) the first and second directions. One or more of the actuators may be a translational actuator and one or more of the actuators may be a rotational actuator. More actuators may be added to the system if needed. For example, in some embodiments, to achieve a full translational and rotational adjustment, three translational and three rotational actuators may be used jointly. The controller may be further configured to adjust the target position so as to align the target with the robotic manipulator.

In another aspect, the invention relates to a method for robotically manipulating a target. In various embodiments, the method comprises the steps of determining a position of the target; coarsely moving a robotic manipulator to the target position; detecting a position of the robotic manipulator; and adjusting the target position based at least in part on the detected position of the robotic manipulator. In various embodiments, the method further comprises determining an optimal path for the robotic manipulator to coarsely move to the target position. By "optimal" is generally meant most efficient, e.g., least wasteful of movement.

For example, the optimal path may be determined based at least in part on the position of the robotic manipulator prior to the movement and the target position, and may also account for the presence of multiple targets to be visited by the manipulator. The speed with which the target position is adjusted may be determined based on the distance between the target and the detected position of the robotic manipulator. The target position may be adjusted so as to align the target with the robotic manipulator.

In still another aspect, the invention pertains to a robotic system for performing a task on a workpiece. In various embodiments, the system comprises a robot comprising a robotic manipulator for manipulating the workpiece; a helper system, physically separate from the robot, comprising a sensing system for sensing a condition of the workpiece, a spatial region containing the workpiece, and/or the robotic manipulator; and a controller, responsive to the sensing system, configured to operate the helper system to assist the robot in performing the task.

In various embodiments, the controller is configured to operate the helper system to manipulate the workpiece. For example, the controller may be configured to operate the helper system to alter a condition within the spatial region containing the workpiece and/or to interact with the robotic manipulator. Of course, manipulations of the target besides positioning—e.g., sawing, screwing on a cap, sealing a bag, applying force, holding with force, etc.—are within the scope of the present invention.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
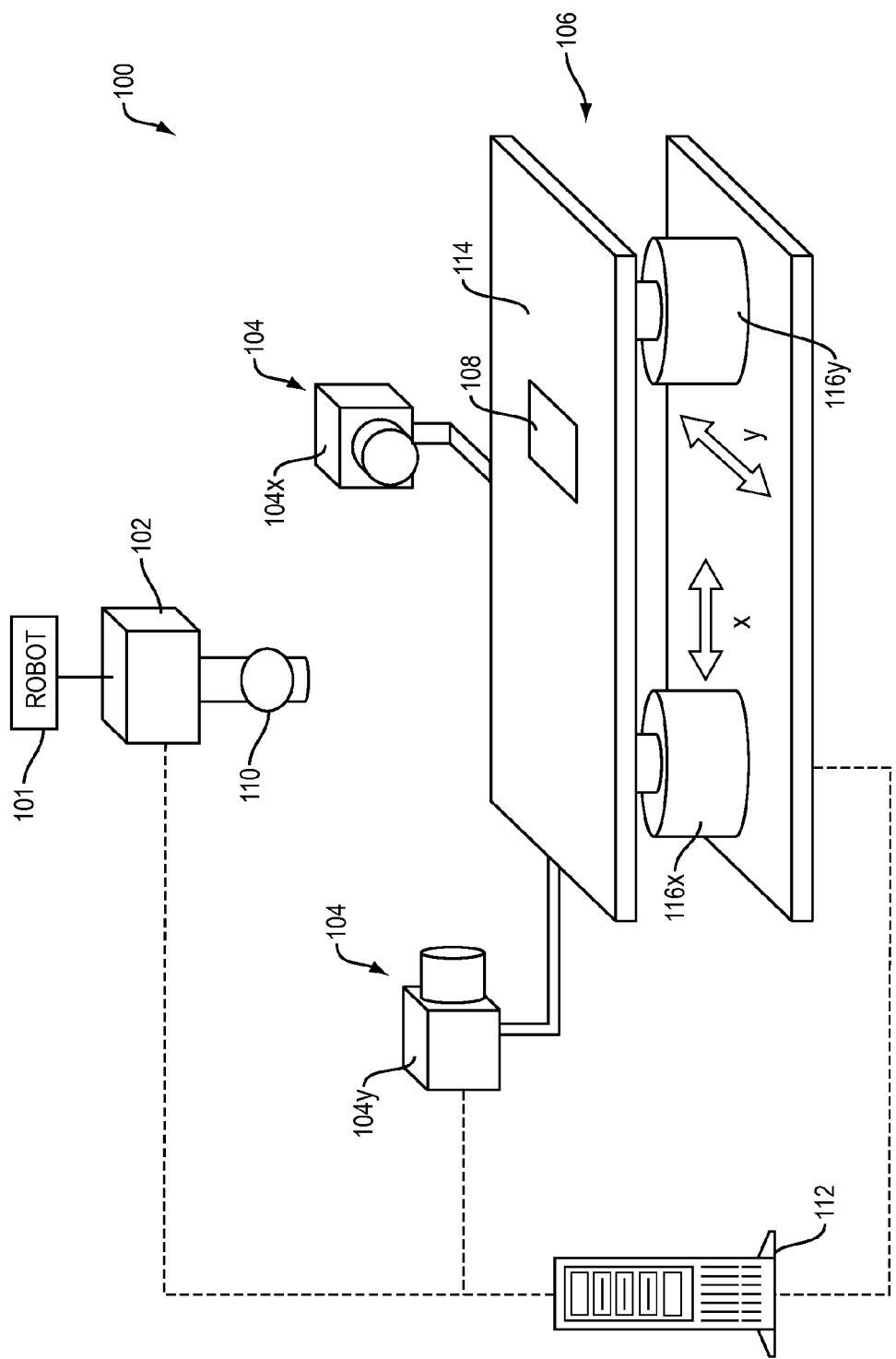
FIG. 1 schematically depicts a robotic system in accordance with embodiments of the present invention.

Refer first to FIG. 1, which illustrates an exemplary embodiment of a spatial adjustment system 100 working in coordination with a robotic system, such as a robot 101 having a robotic manipulator 102, to provide highly precise robotic operations. For example, the robotic system 101 may be a robot as described, for example, in U.S. Ser. Nos. 13/621,658 and 13/621,657, both filed on Sep. 17, 2012, the entire disclosures of which are hereby incorporated by reference.

In various embodiments, the spatial adjustment system 100 includes a tracking system 104 for detecting the position of the robotic manipulator 102 and a positioning system 106 for supporting and moving a target 108. In one implementation, the tracking system 104 includes two sensors—a sensor 104$x$ for detecting the x-axis position and a sensor 104$y$ for detecting the y-axis position. The sensors 104 detect the changing position of the robot arm 102 or portion thereof. The sensors 104 are oriented such that their detection ranges overlap and encompass a working region at least coextensive with the positioning system 106. The sensors 104 may detect signals transmitted or reflected by a tooltip marker 110 located on the robotic manipulator 102 and subsequently provide the detected information (e.g., a signal amplitude) to a controller 112 for determining the position of the robotic manipulator 102. The sensors 104 may be conventional optical sensors, acoustic sensors, ultrasound sensors or any type of device capable of capturing signals generated by the tooltip marker 110 and representing the signals in the form of digital data, or optically detecting and recognizing the tooltip marker 110 using conventional image-acquisition and recognition software. In some embodiments, the positioning system 106 includes a movable platform 114 for supporting the target 108 and one or more actuators 116 (e.g., stepper motors or brushless motors) for moving the platform 114 to dynamically adjust the target position. For example, the actuators 116 may incrementally move the platform independently along the x and y axes and, depending on the application, along the z (vertical) axis, and/or may change the platform orientation with respect to one or more axes. In some embodiments, the sensors are rigidly attached to the movable platform 114.

In one embodiment, the tooltip marker 110 is an infrared (IR) LED marker and the sensors are IR-sensitive cameras. The IR cameras may be arranged in any convenient manner. For example, the IR cameras may be positioned such that their optical axes intersect and are approximately parallel to the respective operating directions of the actuators 116. Additionally, the actuators 116 may be configured so that each can control an independent translational degree of freedom of the platform 114 (e.g., one actuator 116$x$ adjusting the x-axis position, and another actuator 116$y$ adjusting the y-axis position where the x and y axes are orthogonal to each other); this advantageously eliminates the necessity for performing relative calibrations on the cameras 104 and allows independent, decoupled control over the two translational degrees of freedom of the platform 114. Note that the x and y directions are not necessarily orthogonal to each other; they can extend along any direction as long as that they are not parallel to each other. Additionally, although FIG. 1 depicts two actuators 106 operating in the x and y translational directions in a horizontal plane, a combination of any number of the translational and/or rotational actuators can be implemented in the spatial adjustment system 100. For example, the actuators 106 may offer three degrees of translational freedom and three degrees of rotational freedom.

In various embodiments, prior to performing the given task, the controller 112 enters a training mode that specifies a desired target position; this information is provided to the robotic system, which moves the manipulator 102 based thereon. More specifically, an operator may first manually direct the robotic manipulator 102 to various key positions (or waypoints) in the robotic workspace. For example, the operator may align the robotic manipulator 102 with the target workpiece 108 located at a predetermined location and indicate that the robotic manipulator 102 is in its ideal manipulation position by, for example, pressing a button on the robotic system. The robotic system thereupon signals the controller 112, which activates the tooltip marker 110 and causes the tracking system 104 to identify the position of the tooltip marker 110 based on the signals transmitted/reflected therefrom. The determined position of the tooltip marker 110 and the index of the corresponding target may then be stored in memory of the controller 112 for performing tasks at a later time.

Figure 2:
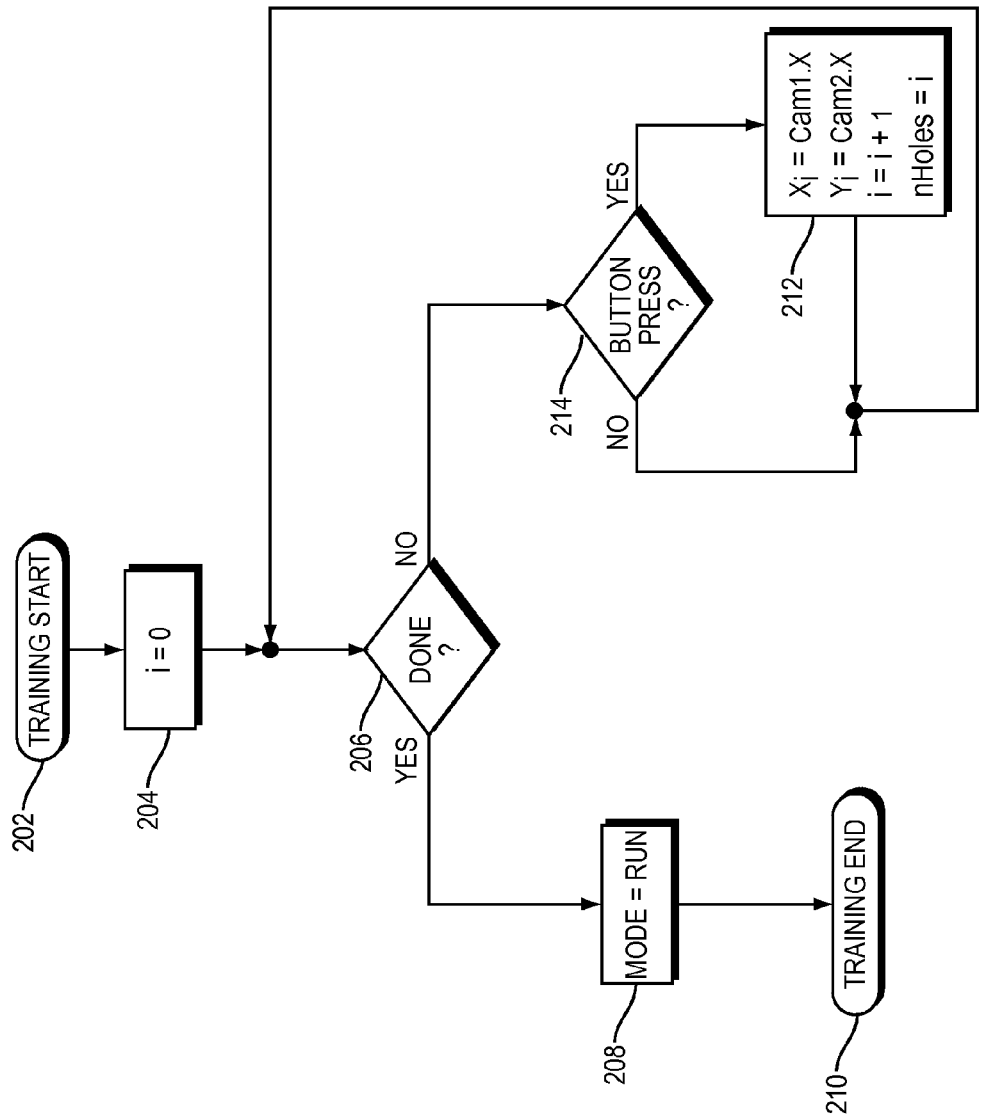
FIG. 2 is a flowchart depicting a representative method of training a robotic manipulator in accordance with embodiments of the present invention.

FIG. 2 depicts a representative method 200 of training the robotic manipulator 102 and the spatial adjustment system 100 in accordance with an embodiment of the current invention. In a first step 202, the controller 112 is set in a training mode to start the training procedure. In a second step 204, the controller 112 records the first target workpiece starting with an index of "0." In a third step 206, the operator moves the robotic manipulator 102 into alignment with the first target and presses a button to indicate whether other targets exist. If there are no more targets, the controller 112 records the detected position of the manipulator 102 as the waypoint (or ideal final position) in the memory and switches to a task-execution mode, thereby exiting the current training process (in a fourth step 208 and a fifth step 210). If, however, there is another target, the controller 112 records both the detected position of the manipulator 102 (again, as a waypoint) and the current target index in memory and incrementally increases the target index (in a sixth step 212). The operator then moves the robotic manipulator 102 into alignment with the next target and indicates whether more targets exist using the approach described above.

Figure 3A:
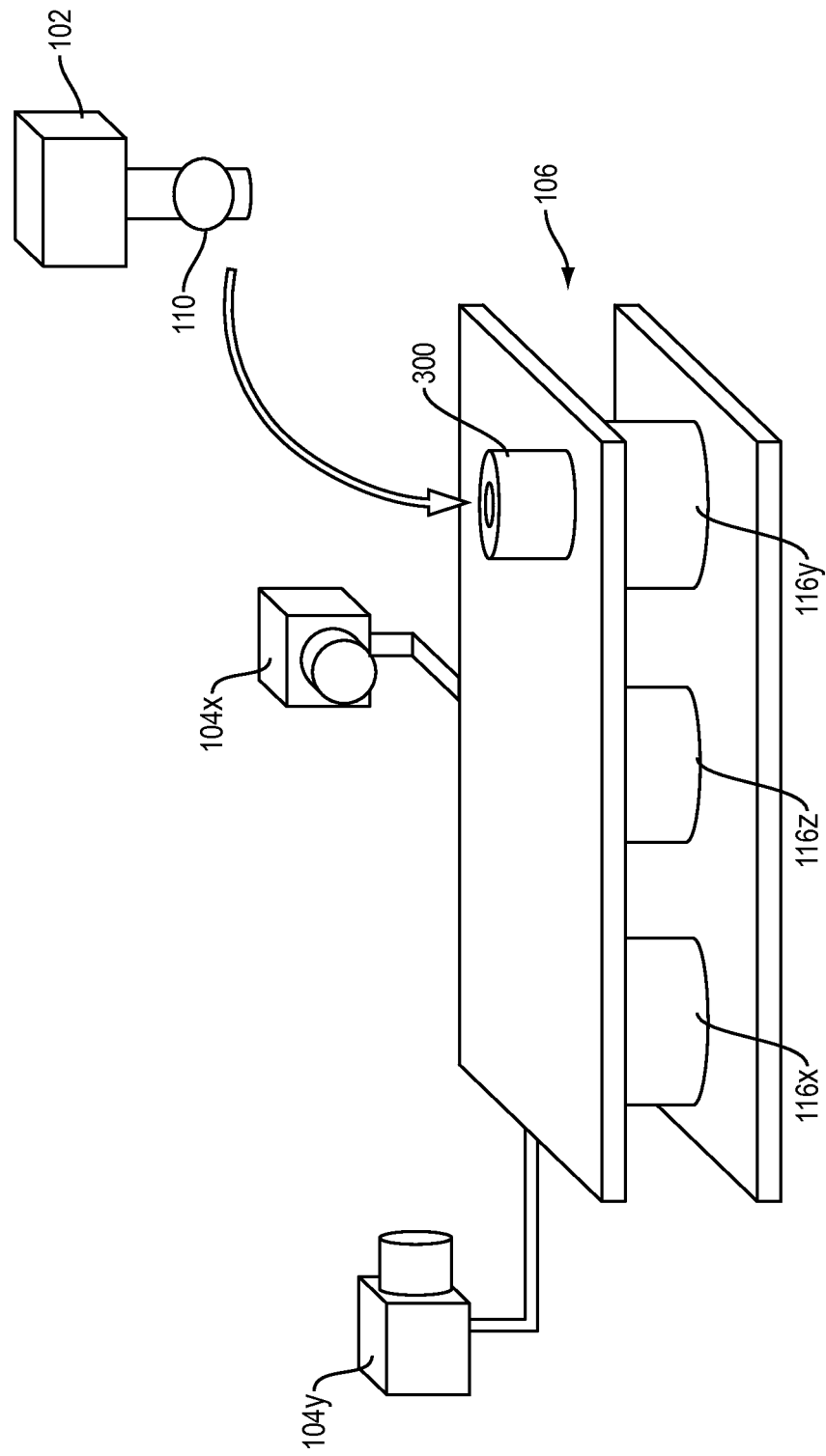
FIGS. 3A-3C schematically depict operation of an embodiment of the present invention.
Figure 3B:
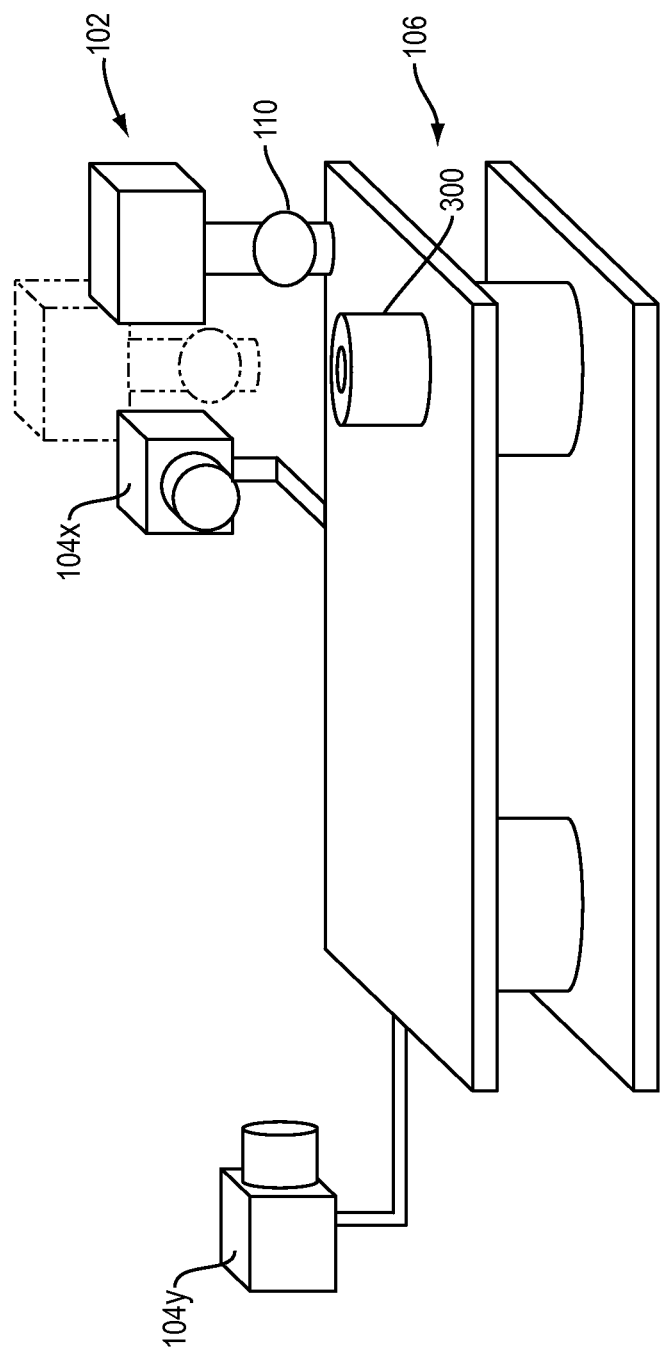
Figure 3C:
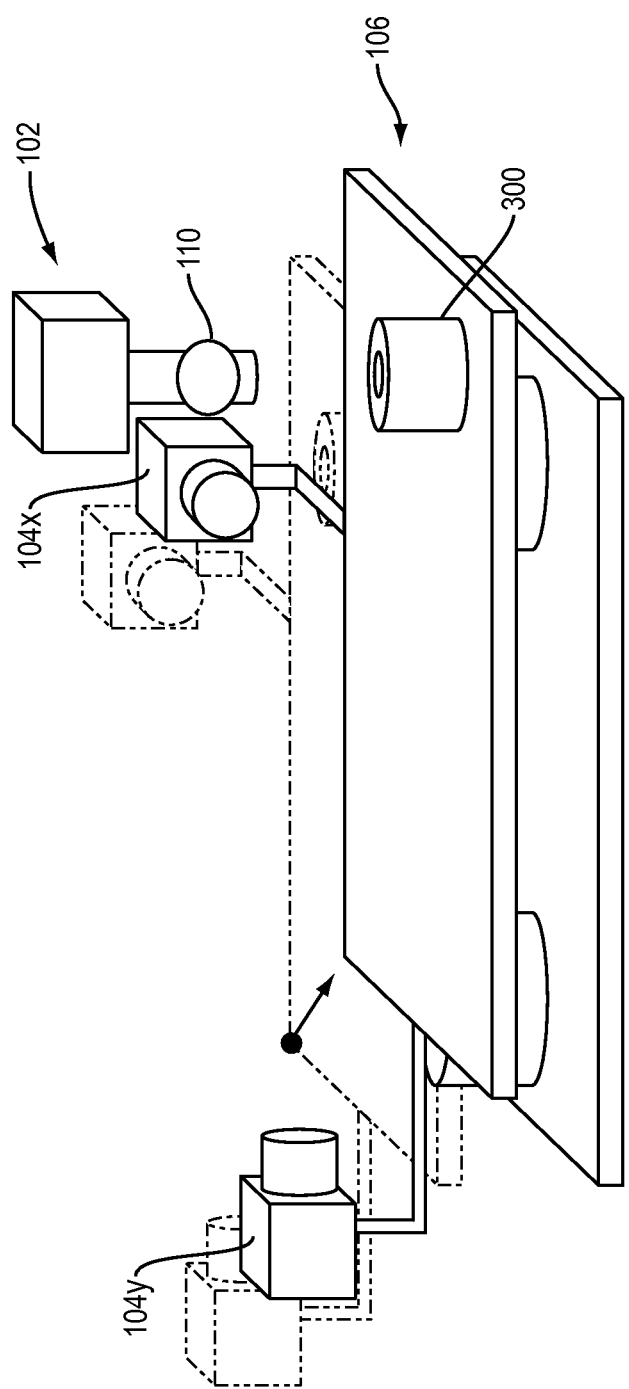

With reference to FIGS. 3A and 3B, in the task-execution mode, the controller 112 first moves the robotic manipulator 102 as close as possible (i.e., as limited by the precision of the robotic system) to the position of the target 300 with the lowest index number (or any desired/identified target) based on the position information stored during training. The sensors in the tracking system 104 are then activated to detect the tooltip marker 110 (e.g., via signals generated/reflected thereby) for determining the actual position of the robotic manipulator 102. The controller 112 compares the detected actual position of the tooltip marker 110 with the stored waypoint position of the robotic manipulator 102 (established during training) and determines the path of motion and/or number of steps that the positioning system 106 needs to take (via the actuators 116x, 116y, 116z) in order to reduce the position difference between the actual position of the tooltip marker 110 (or the robotic manipulator 102) and the waypoint position. Because the controller 112 (see FIG. 1), tracking system 104 and positioning system 106 form a closed-loop feedback system, the position difference may be continuously, iteratively reduced during movement of the robotic manipulator 102. An exact solution of the path of motion and/or the number of steps for adjusting the target position via the positioning system 106 is not necessary—as the position difference decreases, the controller 112 may direct the positioning system 106 to take progressively smaller steps until the robotic manipulator 102 and the target 300 are precisely aligned as depicted in FIG. 3C (with the original position of the positioning system shown in phantom). The robotic manipulator 102 may subsequently perform the given task. When the task for the current target is executed, the robotic manipulator 102 may move to the next target for manipulation using the approach described above.

Because the spatial adjustment system 100 can precisely determine the position of the robotic manipulator 102 and adjust the target position based thereon, the current invention provides spatial precision without the need for fine control over bulky robotic appendages. Additionally, because the spatial adjustment system 100 is physically separate from the robotic system, precision is achieved without utilizing any special components or design for the robotic system or additional load on the robot. Advantages of the present approach also include the ability to arbitrarily move the positioning system 106 in a precise and fast manner in order to eliminate position errors, the ability to coordinate two types of position control, one on-board and the other physically displaced from the robot, and ease and economy of manufacture.

In an exemplary application, the robotic manipulator 102 is programmed to fasten a screw to a screw hole in an object. The screw and/or the object is first placed on the movable platform 114 of the positioning system 106. The spatial adjustment system 100 and robotic manipulator 102 are then operated in the training mode to determine the waypoints of the robotic manipulator 102 (i.e., the position for picking up the screw and/or the position of the screw hole) for performing the task. To simplify the task, a stock screw feeder may be used for screw pick-up. Once the screw is picked up from the feeder, the controller 112 communicates with the spatial adjustment system 100 to determine which screw hole is designated as the first waypoint, and moves the robotic manipulator 102 as close as possible (within the limits of coarse robotic adjustment) to the targeted screw hole. After the difference between the current position of the robotic manipulator 102 and the target position is determined, the controller 112 moves the target (e.g., the screw hole) via the platform 114 to align with the screw located at the end of the manipulator 102. The platform 114 may dynamically follow the trajectory of the robotic manipulator 102 and move at a speed proportional to the distance between the waypoint and the robotic manipulator 102 until contact between the screw and the screw hole is made. A force sensor on the robotic manipulator 102 may monitor the fastening process and report completion of screw insertion to the controller 112. The robotic manipulator 102 is then withdrawn from the current screw hole and moved to the next screw hole (i.e., the next waypoint established during training). This process may repeat until the index of the screw hole is equal to the maximum index stored in the memory or any index number indicating the end of task, or when the robotic system is manually stopped by the operator.

Figure 4:
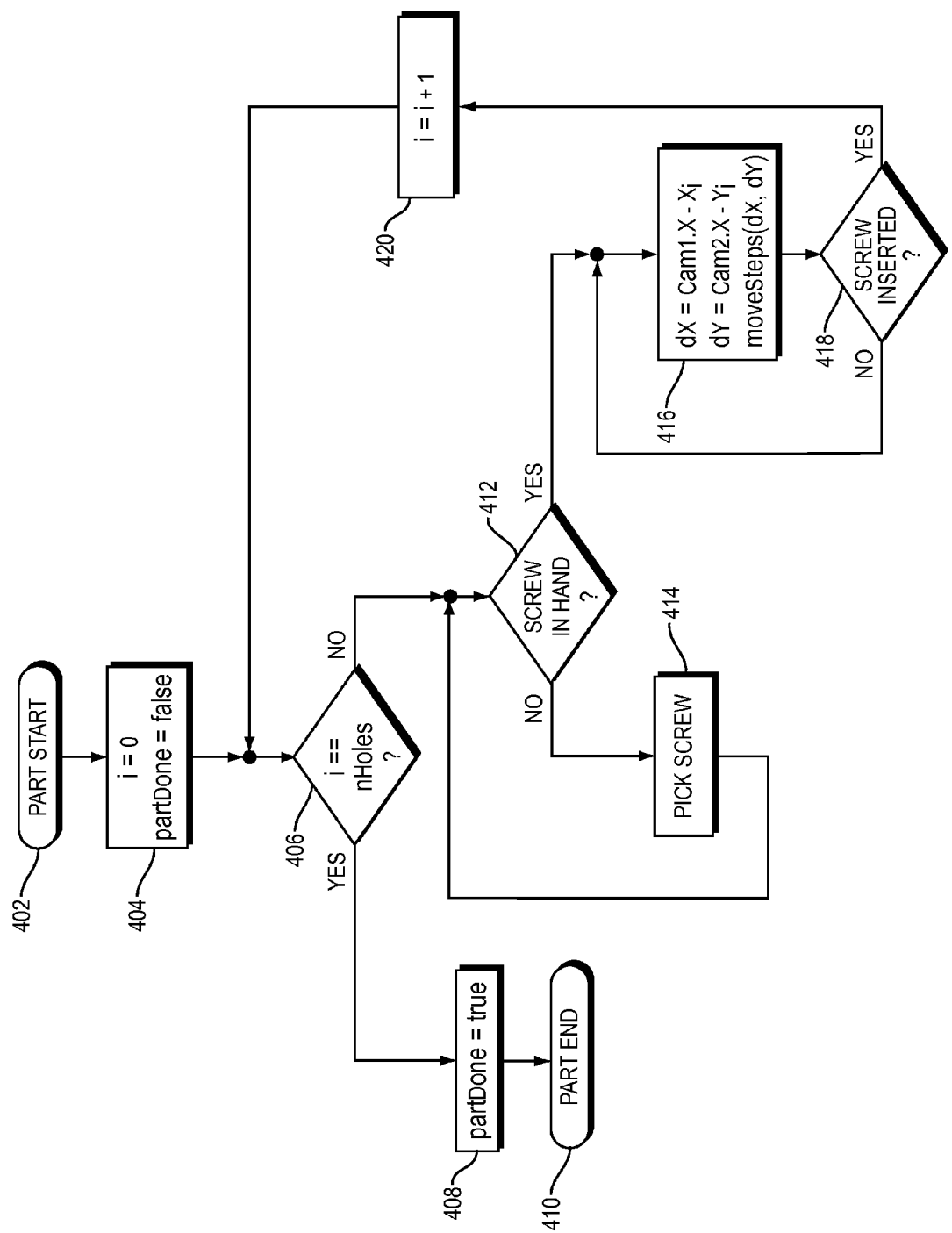
FIG. 4 is a flowchart depicting a representative method for performing a task in accordance with embodiments of the present invention.

A representative method 400 for performing a task, such as fastening a screw in a screw hole, is depicted in FIG. 4. In step 402, the controller 112 is set in an execution mode to start the task. In step 404, the index is set to "0" indicating the beginning of the task and a parameter "partDone" indicating completion of the task is set as "false." In step 406, the controller 112 checks whether the current target index is equal to that of the index indicating the end of the task. If the indices are equal, the partDone is set as "true" (in step 408) and the robotic system does not perform any further target manipulation (in step 410). If the indices are not equal, the robotic system checks whether a screw is held by the robotic manipulator 102 (step 412). If not, the controller causes a screw to be retrieved (step 414), and if so, the controller 112, robotic manipulator 102, and spatial adjustment system 100 work in coordination to perform the given task using the approach described above (step 416). After confirming the screw is securely fastened in the screw hole (step 418), the target index is increased by one (step 420) and the manipulator 102 is moved to perform tasks on subsequent targets.

The precision of positioning the tip of the screw may be affected by many factors, such as the top surface shape of the object having the screw hole, the length of the screw and the distance between the tooltip marker 110 and the screw tip. For example, the shape of the object having the screw hole may prevent signals transmitted from the tooltip marker 110 from being detected by the sensors in the tracking system 104 if the object is positioned too close to the tooltip marker 110. This may result in geometric error in screw tip positioning. In various embodiments, the vertical (z-axis) distance between the tooltip marker 110 and the top surface of the object 300 is considered together with the ideal final position of the tooltip (i.e., the position of the target 300) to create a trajectory for moving the robotic manipulator 102 close to the target. In one implementation, during the training mode, after the robotic arm is brought to its ideal final position, the robotic arm is allowed to retreat directly away therefrom; the retreat trajectory is recorded. The controller 112 then performs a linear fit to the recorded trajectory, estimates parameters associated with the linear retreat trajectory and stores the parameters alongside the final desired position in the memory. During the task-execution mode, if the tracking system 104 cannot detect signals transmitted/reflected from the tooltip marker 110, the robotic manipulator 102 may follow the predetermined linear trajectory until the signals are detected again.

To determine the parameters associated with the linear approach, the position of the tooltip 110 in the horizontal plane is assumed to depend linearly on its height above the target. Since both horizontal directions, x and y, are decoupled in control and sensing, a change in each horizontal position can be described independently of changes in the other horizontal position to arrive to the independent control parameters for the x-axis and y-axis motors. As an example, movement in the x horizontal direction can be computed, and the same calculations repeated for the y direction in exactly the same way to derive the y-axis motor control parameters. The relationship between the x horizontal direction and the height of the tooltip is given as:

$$x = az + b \quad (1)$$

where z and x are the height and horizontal position, respectively. The linear parameters a and b may be determined based on a number of position points collected during training by raising the robotic arm vertically from the target position to a position at the beginning of the initial linear path above the hole.

For each target with an index i, and N trajectory points in the detection range of the tracking sensors, two matrices can be expressed in the horizontal and vertical coordinates (x and z) as follows:

$$X_i = [x_1^i, x_2^i, \ldots, x_N^i] X_i = [x_1^i, x_2^i, \ldots, x_N^i] \quad (2)$$

$$Z_i = \begin{bmatrix} z_1^i, z_2^i, \ldots, z_N^i \\ 1, 1, \ldots, 1 \end{bmatrix} \quad (3)$$

where equation (3) expresses a vertical coordinate in a homogeneous coordinate system. Equation 1 can then be re-written for all collected points simultaneously as:

$$X_i = P_i Z_i \quad (4)$$

This leads to a standard solution for an over-determined linear system and gives parameters of a linear approach to the i-th target as:

$$P_i = [a_i, b_i] = X_i Z_i^T (Z_i Z_i^T)^{-1} \quad (5)$$

As a result, during the task-execution mode, the parameters describing the linear trajectory to the i-th target may be retrieved along with the final desired position. During the movement of the robotic manipulator 102, the controller 112 may calculate a dynamic adjustment of the tooltip position (x(t); z(t)) by projecting the current tooltip position, x(t), onto the determined ideal linear trajectory. This projection thus provides the controller 112 with an intermediate "target" position for moving the robotic manipulator 102 therethrough. This allows the robotic manipulator 102 to travel based on the ideal linear trajectory, rather than tending toward the final ideal position exclusively. Accordingly, the linear trajectory avoids failure of the robotic manipulator 102 caused by, for example, signals from the tooltip marker 110 occluded by some components or sudden position changes of the robotic manipulator 102 due to small instabilities in the robotic arm control system, the inherent misalignments between the sensors and the actuators 116, etc.

For example, for a measured vertical position, z(t), of the tooltip marker 110, the ideal horizontal position, $x_i^*(t)$, taken at this height may be given as:

$$x_i^*(t) = a_i z(t) + b_i \quad (6)$$

This position may be matched by moving the platform 114 a number of steps, K, to minimize the position difference between this ideal position and the actual horizontal position of the tooltip marker 110; the number of steps, K, may be determined as:

$$K(t) = \gamma(x(t) - x_i^*(t)) \quad (7)$$

where γ is the velocity gain, which is a constant or a function relating to the distance from the tooltip market 110 to the target. Thus, equation (7) provides information about the number of steps, K, that the positioning system 106 needs to move to minimize the position error. This adjustment process may repeat until the manipulator 102 reaches the top surface of the target.

More generally, the principles of the invention may be applied to "helper" systems that are physically distinct from the robot but assist the robot in executing a task. For example, the platform-movement system described above is a helper that manipulates the workpiece—specifically, its position relative to a manipulator of the robot. In other embodiments, the helper system may manipulate the workpiece in a different way (e.g., heating or cooling it based on a temperature measurement made by an associated temperature sensor), or may alter a condition within the spatial region containing the workpiece; again, this may involve heating or cooling the region using, for example, a convective air flow. In still other embodiments, the helper system interacts with the robotic manipulator, e.g., by finely adjusting its position, preparing it for an operation (e.g., by sheathing an appendage), etc. Thus, the helper system may be equipped with any suitable sensors and actuators relevant to the function or functions it carries out.

The controller 112 described herein may be implemented in the robotic system, spatial adjustment system or a system external to the robotic and spatial adjustment systems. In addition, the controller 112 may be implemented in software, hardware, or some combination thereof. For example, the system may be implemented on one or more server-class computers, such as a PC having a CPU board containing one or more processors. The memory described herein may include random access memory (RAM), read-only memory (ROM), and/or FLASH memory residing on commonly available hardware such as one or more application-specific integrated circuits (ASIC), field-programmable gate arrays (FPGA), electrically erasable programmable read-only memories (EEPROM), programmable read-only memories (PROM), or programmable logic devices (PLD). In some embodiments, the programs may be provided using external RAM and/or ROM such as optical disks, magnetic disks, as well as other commonly used storage devices.

For embodiments in which the controller 112 is provided as a software program, the program may be written in any one of a number of high level languages such as FORTRAN, PASCAL, JAVA, C, C++, C#, LISP, PERL, BASIC, PYTHON or any suitable programming language.

Figure 5:
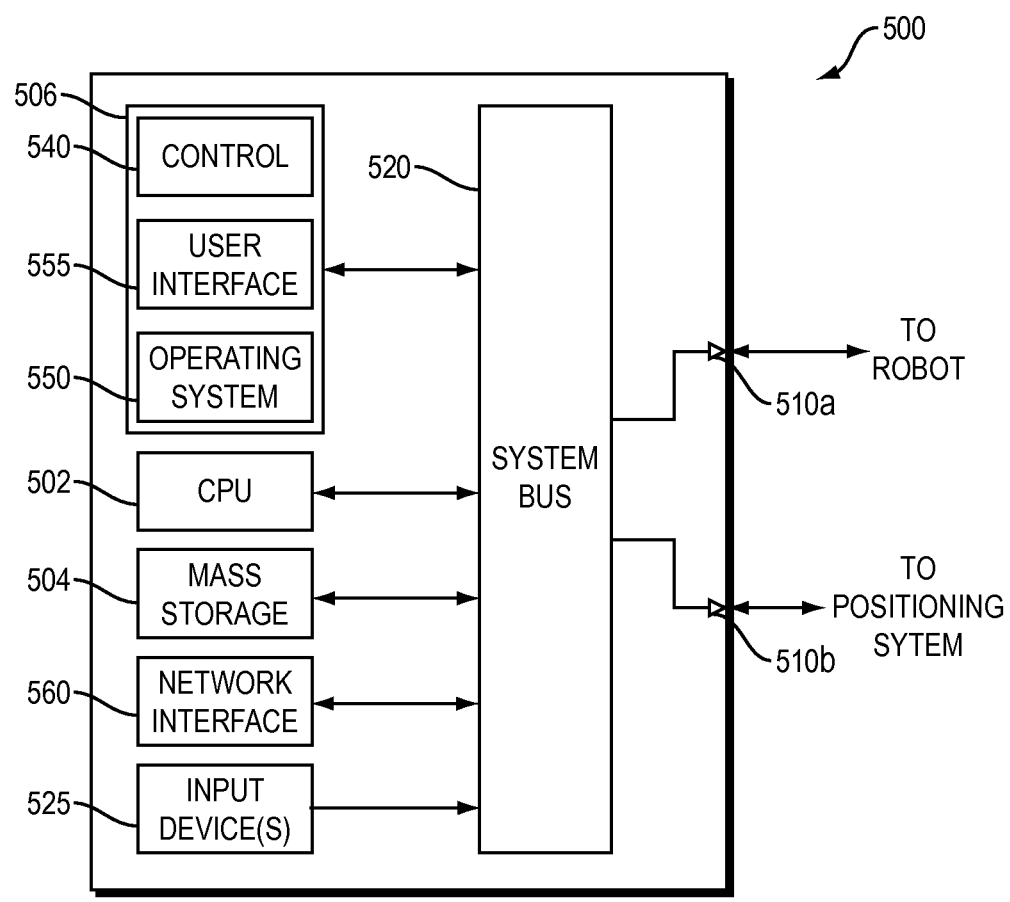
FIG. 5 schematically depicts a controller in accordance with embodiments of the present invention.

A representative control system, indicated generally at 500 in FIG. 5, executes program instructions to perform the functions described above. The system 500 includes a central processing unit ("CPU") 502 and one or more computer storage devices indicated generally at 504, 506. Ordinarily, the storage device 504 provides nonvolatile mass storage, and may be, for example, an EEPROM, Flash ROM, hard disk or CD-ROM drive; and storage 506 comprises a combination of volatile RAM for temporary storage and processing, and nonvolatile PROM that contains permanent aspects of the system's operating instructions. The system 500 further includes a plurality of input/output (I/O) modules including I/O modules 510a, which is connected (wirelessly or via cables) to the robot arm 102 (or the robot 100), and 510b, which communicates with the positioning system 116. These I/O modules allow the controller 500 to sense the condition of, and send control signals to, the robot arm and the positioning system. The various internal components of the controller 500 intercommunicate over a bidirectional system bus 520. The controller 500 also comprises one or more input devices 525, also connected to the bus 520, that permit the operator to program the controller and/or enter information.

Storage 506 contains a series of functional blocks or modules that implement the functions performed by the controller 500 as described above through operation of the CPU 502. A control block 540 contains computer-executable instructions for operating the positioning system 116 via the I/O module 510a. Storage 506 may also include an operating system 550, which directs the execution of low-level, basic system functions such as memory allocation, file management and operation of the storage device 504; and instructions defining a user interface 555, which facilitates straightforward interaction with an operator. A network interface 560 facilitates communication with the controller 500 via a remote network or network host.

As used herein, the term "approximately" means ±10%, and in some embodiments, ±20%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A robotic system for manipulating a target, the system comprising:
   a robot including a movable robotic manipulator;
   a positioning system, physically separate from the robot and the robotic manipulator, for supporting and moving the target;
   a tracking system for detecting a position of the robotic manipulator; and
   a controller,
   wherein (i) the robot is configured to move the robotic manipulator into proximity to the target, and (ii) the controller is responsive to the tracking system and is configured to control the positioning system to adjust a position of the target based at least in part on the position of the robotic manipulator detected by the tracking system.

2. The system of claim 1, wherein the positioning system comprises:
   a movable platform for supporting the target; and
   at least one actuator, responsive to the controller, for moving the platform for adjusting the target position.

3. The system of claim 2, wherein the robotic manipulator comprises a light source and the tracking system comprises an imaging device.

4. The system of claim 3, wherein the light source generates light outside a spectrum visible to human eyes.

5. The system of claim 2, wherein the positioning system comprises a first actuator for translating the target in a first direction and a second actuator for translating the target in a second direction, the second direction being different from the first direction.

6. The system of claim 5, the positioning system further comprises a third actuator for translating the target in a third direction, the third direction being different from the first and second directions.

7. The system of claim 2, wherein the at least one actuator is a plurality of actuators at least one of which is a translational actuator and at least one of which is a rotational actuator.

8. The system of claim 1, wherein the controller is further configured to adjust the target position so as to align the target with the robotic manipulator.

9. A method for robotically manipulating a target, the method comprising:
   determining a position of the target;
   coarsely moving a movable robotic manipulator of a robot into proximity to the target position without moving the target;
   detecting a position of the robotic manipulator; and
   moving the target to adjust a position thereof relative to the robotic manipulator based at least in part on the detected position of the robotic manipulator.

10. The method of claim 9, further comprising determining an optimal path for the robotic manipulator to coarsely move to the target position.

11. The method of claim 10, wherein the optimal path is determined based at least in part on a position of the robotic manipulator prior to the movement and the target position.

12. The method of claim 11, wherein the optimal path is further determined based at least in part on a position of a second target.

13. The method of claim 9, wherein a speed of the target position adjustment is determined based on a distance between the target and the detected position of the robotic manipulator.

14. The method of claim 9, wherein the target position is adjusted so as to align the target with the robotic manipulator.

15. A robotic system for performing a task on a workpiece, the system comprising:
   a robot comprising a movable robotic manipulator for manipulating the workpiece;
   a helper system, physically separate from the robot, comprising:
      a sensing system for sensing a condition of at least one of (a) the workpiece, (b) a spatial region containing the workpiece, or (c) the robotic manipulator; and
      a controller, responsive to the sensing system, configured to operate the helper system to assist the robot in performing the task by moving the workpiece relative to the robotic manipulator.

16. The system of claim 15, wherein the controller is configured to operate the helper system to manipulate the workpiece.

17. The system of claim 15, wherein the controller is configured to operate the helper system to alter a condition within the spatial region containing the workpiece.

18. The system of claim 15, wherein the controller is configured to operate the helper system to interact with the robotic manipulator.

* * * * *